US012704978B2

(12) United States Patent
Kale et al.

(10) Patent No.: US 12,704,978 B2
(45) Date of Patent: Aug. 11, 2026

(54) MANAGEMENT OF VEHICLE SYSTEM INFORMATION USING A DEEP LEARNING DEVICE

(71) Applicant: Micron Technology, Inc., Boise, ID (US)

(72) Inventors: Poorna Kale, Folsom, CA (US); Saideep Tiku, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 243 days.

(21) Appl. No.: 18/526,912

(22) Filed: Dec. 1, 2023

(65) Prior Publication Data

US 2024/0184456 A1 Jun. 6, 2024

Related U.S. Application Data

(60) Provisional application No. 63/430,475, filed on Dec. 6, 2022.

(51) Int. Cl.
*G06F 3/06* (2006.01)

(52) U.S. Cl.
CPC .......... *G06F 3/0622* (2013.01); *G06F 3/0608* (2013.01); *G06F 3/0655* (2013.01); *G06F 3/0679* (2013.01)

(58) Field of Classification Search
CPC .... G06F 3/0622; G06F 3/0608; G06F 3/0655; G06F 3/0679
USPC .......................................................... 701/32.2
See application file for complete search history.

(56) References Cited

U.S. PATENT DOCUMENTS

| | | | | |
|---|---|---|---|---|
| 2006/0259218 A1* | 11/2006 | Wu | G07C 5/085 | 701/33.4 |
| 2018/0063539 A1* | 3/2018 | Ueno | G08G 1/0141 | |
| 2021/0397771 A1* | 12/2021 | Kale | G06F 30/331 | |
| 2024/0069791 A1* | 2/2024 | Noda | G06F 3/067 | |
| 2025/0044983 A1* | 2/2025 | Sood | G07C 5/08 | |

* cited by examiner

*Primary Examiner* — Mahmoud S Ismail
(74) *Attorney, Agent, or Firm* — Holland & Hart LLP

(57) ABSTRACT

Methods, systems, and devices for management of vehicle system information using a deep learning device are described. The deep learning device of a vehicle (such as a deep learning accelerator (DLA)) may receive information associated with an environment of the vehicle from one or more sensors of the vehicle. The DLA may perform one or more operations using one or more machine learning models. For example, the DLA may compress the information which may reduce a resolution associated with the information, a frame rate associated with the information, or both. The DLA may generate, as part of a run-time operation, a first set of analytics associated with operation of the vehicle using the compressed information. Additionally, or alternatively, the DLA may generate, as part of a post-processing operation, a second set of analytics using the compressed or an uncompressed version of the information.

18 Claims, 6 Drawing Sheets

Remote Server 225

230-a
230-e
230-f
215-a
250-d
235-d
215-f
205
215-e
230-h
235-c
250-c
215-b
250-b
240-a
230-i
235-b
210-b
210-a
250-a
235-a
230-b
240-c
215-d
240-b
215-g
215-c
245
230-c
230-d
230-g

200

MANAGEMENT OF VEHICLE SYSTEM INFORMATION USING A DEEP LEARNING DEVICE

CROSS REFERENCE

The present Application for Patent claims priority to and the benefit of U.S. Provisional Application No. 63/430,475 by Kale et al., entitled "MANAGEMENT OF VEHICLE SYSTEM INFORMATION USING A DEEP LEARNING DEVICE," filed Dec. 6, 2022, assigned to the assignee hereof, and is expressly incorporated by reference in its entirety herein.

TECHNICAL FIELD

The following relates to one or more systems for memory, including management of vehicle system information using a deep learning device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
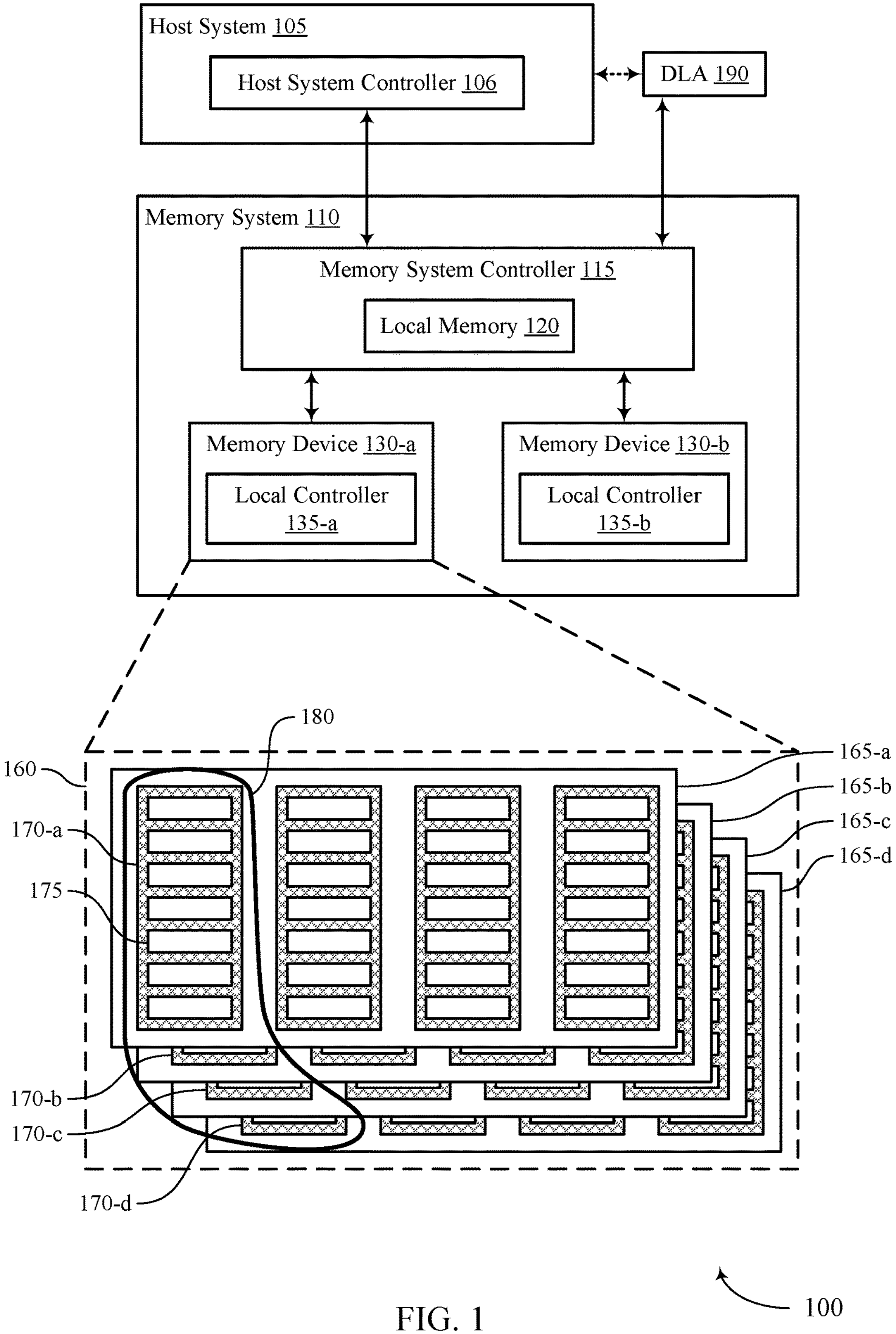
FIGS. 1, 2, 3, and 4 illustrate examples of systems that support management of vehicle system information using a deep learning device in accordance with examples as disclosed herein.

Some systems, such as a vehicle system, may implement devices or computing components that interact with the vehicle system, or an environment associated with the vehicle system. For example, a zonal computing system of the vehicle system may include devices or computing devices that may include sensors for measuring physical properties associated with the vehicle or an environment of the vehicle and actuators configured to control various vehicle systems or subsystems. The sensors may include devices such as a camera, a non-visible light detection device (e.g., infrared (IR) light cameras), a motion sensor, a radar sensor, a speedometer, a gas meter, a fuel temperature sensor, an oxygen sensor, a light detection and ranging (LiDAR) sensor, among other types of sensors that may gather information about the environment or the vehicle. In some examples, the zonal computing system may store data (e.g., information collected from the sensors) to a data recorder (e.g., a storage device), which may be referred to as a black box data recorder. In some cases, the data may be subsequently stored to a remote server associated with the vehicle (e.g., the cloud), which may support post-processing analysis to be performed on the data after initial storage. However, some implementations of the zonal computing system may lack the capability to process the information collected from the one or more sensors during run-time operation of the vehicle, for example, due to latency restraints. In such implementations, the zonal computing system may be unable to perform run-time analysis on the data.

According to the techniques described herein, the zonal computing system may leverage one or more machine learning devices, such as a deep learning accelerator (DLA), which may support generating run-time analytics. For example, a DLA may perform tasks such as machine vision, voice recognition, object identification, and natural language processing (e.g., among others), more rapidly while using less power compared to if a general-purpose computer were to perform such tasks, for example, by implementing one or more machine learning models (e.g., neural networks) trained to perform such tasks. The DLA (e.g., coupled with or included in a black box data recorder) may receive sensor information and use one or more machine learning models to generate the run-time analytics of the received sensor information. Additionally, or alternatively, the DLA may support compression techniques using the one or more machine learning models to compress the sensor information which may increase storage efficiency of the zonal computing system and decrease latency associated with performing run-time analysis on the sensor information. In some examples, the zonal computing system may also store one or both of the compressed sensor information and a non-compressed version (e.g., copy) of the sensor information to a storage device at the vehicle. As such, the DLA may perform post-processing analysis on the compressed sensor information and/or the non-compressed sensor information stored at the vehicle (e.g., rather than stored on the cloud), which may further leverage the machine learning models of the DLA to generate the post-processing analytics more efficiently.

Features of the disclosure are initially described in the context of systems, devices, and circuits with reference to FIGS. 1 through 4. These and other features of the disclosure are further illustrated by and described in the context of an apparatus diagram and flowchart that relate to management of vehicle system information using a deep learning device with reference to FIGS. 5 and 6.

FIG. 1 illustrates an example of a system 100 that supports management of vehicle system information using a deep learning device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be “block 0” of plane 165-*a*, block 170-*b* may be “block 0” of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support management of vehicle system information using a deep learning device.

For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The system 100 may include one or more DLAs 190, which may be coupled with the memory system 110, the host system 105, or a combination thereof. A DLA 190 may be an example of a deep learning device which may use a machine learning model (e.g., one or more neural networks) to perform various operations. For example, the DLA 190 may include one or more neural networks (among other types of machine learning models) that are trained to perform various inference tasks, such as data analytics, machine vision, voice recognition, and natural language processing, among other tasks for which neural networks may be trained. In some examples, the DLA 190 may include a processor chipset and a software stack executed by the processor chipset. The processor chipset may include one or more cores, one or more caches (e.g., memory local to or included in the DLA 190), and a storage protocol controller (e.g., PCIe controller), among other components. In some cases, the DLA 190 may be a field programmable gate array (FPGA) based device, such as a modular FPGA-based architecture that implements an inference engine that may be tuned for various neural networks. In some examples, the DLA 190 may operate multiple neural networks concurrently. In some examples, a neural network may be implemented on a single DLA 190 or across multiple DLAs 190. The DLA 190 may be trained to perform or support one or more operations of the host system 105 using one or more neural networks.

The memory system 110 may be incorporated into (e.g., included in, added to) a zonal computing system of a vehicle, for example, to assist in the generation of analytics (e.g., run-time analytics, post-processing analytics) of information collected by sensors associated with a zonal computing system of a vehicle using the DLA 190. For example, the zonal computing system may include devices, such as sensors or actuators, that are configured to interact with the vehicle, or the environment associated with the vehicle. Additionally, the zonal computing system may include one or more central processors configured to communicate information with the devices and manage some operations of the vehicle based on the communicated information. The information may be routed through one or more gateway processors of the zonal computing system. In some examples, the memory system 110 may be used to store information routed between various components of the zonal computing system (e.g., sensors, actuators, processors, DLAs 190). In some examples, the memory system 110 may support authentication capabilities, for example, to verify whether devices of the zonal computing system are trusted devices and may to enable or disable communications with the devices accordingly. In some examples, the host system 105 may be included in the zonal computing system of the vehicle. For instance, the host system 105 may be an example of a central processor of the zonal computing system, a gateway processor of the zonal computing system, or a device of the zonal computing system.

The zonal computing system may leverage one or more DLAs 190, which may support generating run-time analytics and/or post-processing analytics associated with information collected from one or more sensors included in the zonal computing system. For example, the one or more DLAs 190 may receive sensor information (e.g., routed to the one or more DLAs via the memory system 110, such as via the memory system controller 115) and perform a run-time analysis on the sensor information to generate corresponding run-time analytics. Additionally or alternatively, the one or more DLAs 190 may support compression techniques using the one or more machine learning models to compress the sensor information, which may increase storage efficiency of the zonal computing system and decrease latency associated with performing run-time analysis on the information. In some examples, the zonal computing system may also store one or both of the compressed sensor information and a non-compressed version of the sensor information to the memory system 110 (e.g., a memory device 130 of the memory system 110). As such, the DLAs 190 may perform post-processing analysis on the compressed sensor information and/or the non-compressed information stored at the vehicle (e.g., rather than stored on the cloud), which may further leverage the machine learning models of the DLAs 190 to generate the post-processing analytics more efficiently.

It is noted that, in some examples, the techniques described herein are described with reference to the memory system 110 being a NAND memory system, however, the techniques described herein may be adapted and applied to support such techniques within any type of memory system (e.g., a DRAM system, an FeRAM system, a PCM system, etc.).

Figure 2:
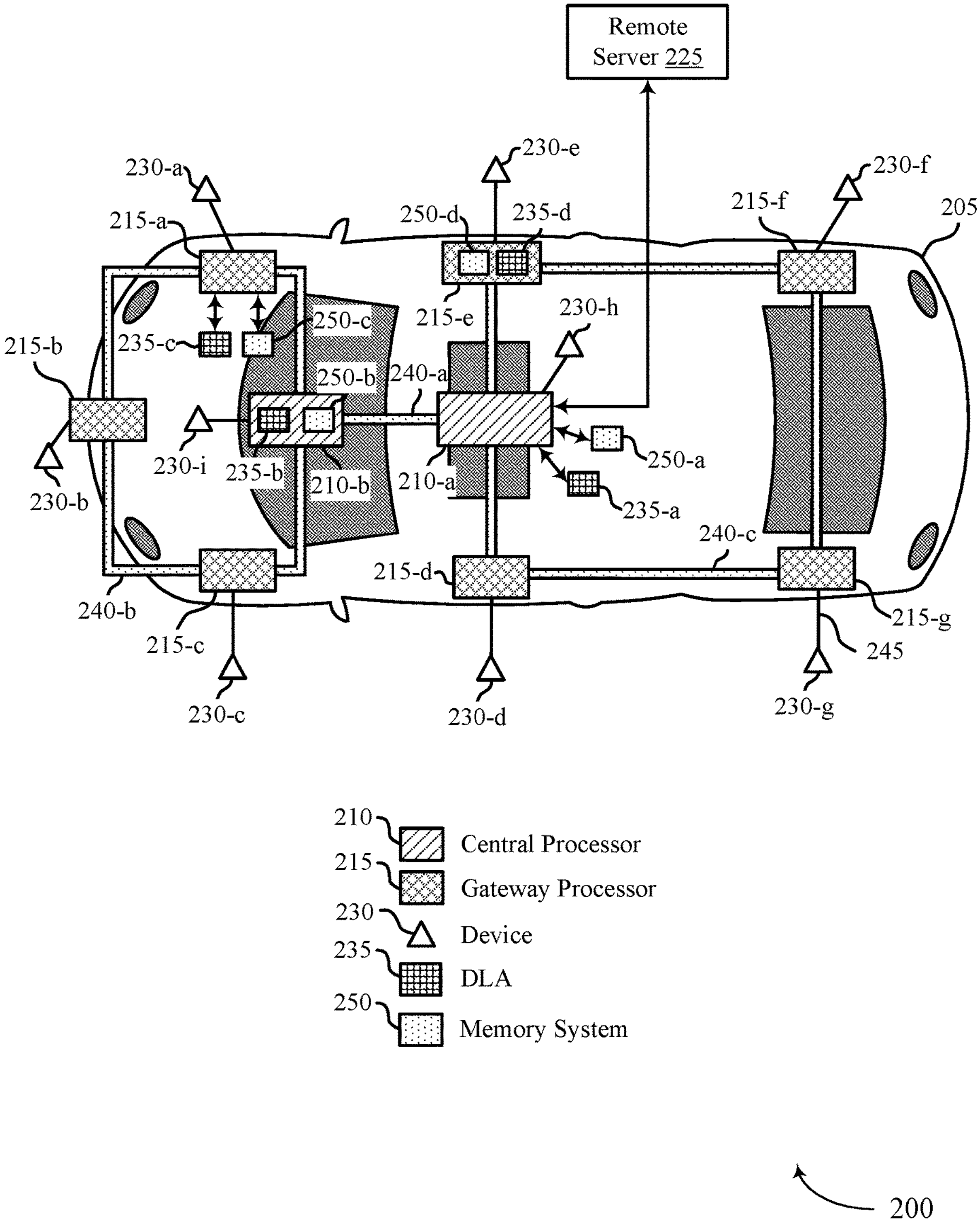

FIG. 2 illustrates an example of a system 200 that supports management of vehicle system information using a deep learning device in accordance with examples as disclosed herein. The system 200 may implement or be implemented by aspects of the system 100 described with reference to FIG. 1. For example, the system 200 may depict operation of a zonal computing system of a vehicle 205 that includes various components, such as central processors 210, gateway processors 215, memory systems 250, devices 230, and DLAs 235 which may be examples of corresponding devices described with reference to FIG. 1. In some cases, devices 230 may include devices such as sensors or actuators for the system 200. Additionally, the system 200 may support the utilization of machine learning processes via the DLAs 310 to enable information compression operations on data received from (e.g., collected by) the devices 230. Additionally, or alternatively, the DLAs 310 may perform run-time analytics and post-processing analytics on the information received from the devices 230.

The vehicle 205 may implement a zonal computing system to manage various devices that may be included in the vehicle 205. For example, the vehicle 205 may include a zonal computing system in which different groups of components of the vehicle 205 are divided into various zones and managed in accordance with the zones. The zonal computing system may include one or more central processors 210 that are configured to communicate with a remote server 225. For example, the zonal computing system may include a central processor 210-*a* and a central processor 210-*b* that may each be configured to communicate with the remote server 225. In some examples, the remote server 225 may provide the vehicle 205 access to a network, and the vehicle 205 may receive data from the network via the remote server 225. In some examples, the remote server 225 may be an example of a cloud server. The central processors 210 may communicate with the remote server 225 wirelessly, for example, using one or more antennas of the vehicle 205 in accordance with one or more radio access technologies.

The central processors 210 may additionally be configured to communicate with various zones of the zonal computing system. For example, the zonal computing system may include: gateway processors 215; and devices 230, which may include actuators that are configured to control (e.g., trigger, cause, or perform actions with) a subsystem of the vehicle 205 or sensors that are configured to measure (e.g., record, capture, detect, track) a physical property associated with the vehicle 205 or an environment associated with the vehicle 205 (e.g., a motion sensor, a camera, a radar sensor, a speedometer, a gas meter, a fuel temperature sensor, an oxygen sensor, a LiDAR sensor, or some other sensor that may be included in the vehicle 205); among other computing components that may be included in the zonal computing system. Each of the gateway processors 215 and devices 230 may be associated with a respective zone of the zonal computing system. The gateway processors 215 may be coupled with at least one of the central processors 210 (e.g., directly or via one or more other gateway processors 215) and with one or more devices 230, or a combination thereof. Additionally, the gateway processors 215 may be configured to route communications between the at least one central processor 210 and the respective devices 230 with which the gateway processors 215 are coupled. Accordingly, the central processors 210 may be configured to communicate with devices 230 of a zone via one or more gateway processors 215 associated with the zone. In some examples, a zone may include a communication path coupled with one or more gateway processors 215.

In the example of FIG. 2, the zonal computing system may include gateway processors 215-*a*, 215-*b*, 215-*c*, 215-*d*, 215-*e*, 215-*f*, and 215-*g*, although any quantity of gateway processors 215 may be included in the zonal computing system of the vehicle 205. In some examples, each gateway processor 215 may be associated with a different zone of the zonal computing system. For example, the gateway processor 215-*a* may be associated with a first zone of the zonal computing system, the gateway processor 215-*b* may be associated with a second zone of the zonal computing system, the gateway processor 215-*c* may be associated with a third zone of the zonal computing system, and so on. In other examples, multiple gateway processors 215 may be associated a single zone of the zonal computing system. For example, the gateway processors 215-*a*, 215-*b*, and 215-*c* may be associated with the first zone; the gateway processors 215-*d* and 215-*e* may be associated with the second zone, and the gateway processors 215-*f* and 215-*g* may be associated with the third zone. In some examples, the central processors 210 may be coupled with one or more devices 230. For example, the central processor 210-*a* may be coupled with a device 230-*h*, and the central processor 210-*b* may be coupled with a device 230-*i*. In some examples, the device 230-*h* and 230-*i* may be associated with different zones of the zonal computing system or with one of the zones with which the central processors 210 are configured to communicate (e.g., one of the zones associated with a gateway processor 215).

The devices 230 included in the vehicle 205 may be associated with the respective zones of the gateway processors 215 with which they are coupled. For example, in the example of FIG. 2, the gateway processor 215-*a* may be coupled with a device 230-*a*, the gateway processor 215-*b* may be coupled with a device 230-*b*, the gateway processor 215-*c* may be coupled with a device 230-*c*, the gateway processor 215-*d* may be coupled with a device 230-*d*, the gateway processor 215-*e* may be coupled with a device 230-*e*, the gateway processor 215-*f* may be coupled with a device 230-*f*, and the gateway processor 215-*g* may be coupled with a device 230-*g*. Each of the devices 230-*a* through 230-*g* may be associated with (e.g., included in) the zone with which the corresponding gateway processor 215 is associated (e.g., the first zone through a seventh zone, respectively).

The components of the zonal computing system may communicate according to various communication protocols. For example, the central processors 210 and the gateway processors 215 may be coupled via various signal buses 240 that operate according to a first communication protocol. For instance, the central processor 210-*a* and the central processor 210-*b* may communicate via a signal bus 240-*a*. The central processor 210-*b* may communicate with the gateway processors 215-*a*, 215-*b*, and 215-*c* via a signal bus 240-*b*. The central processor 210-*a* may communicate with the gateway processors 215-*d*, 215-*e*, 215-*f*, and 215-*g* via a signal bus 240-*c*. In some examples, the central processors 210 may communicate with the gateway processors 215 directly or indirectly via the signal buses 240. For example, the central processor 210-*b* may be directly coupled with the gateway processors 215-*a* and 215-*c* via the signal bus 240-*b* and indirectly coupled with the gateway processor 215-*b* via the signal bus 240-*b* via the gateway processor 215-*a*, the gateway processor 215-*c*, or both. Thus, communications between the central processor 210-*b* and the gateway processor 215-*b* may be routed through the gateway processor 215-*a*, the gateway processor 215-*c*, or both. Additionally, the central processor 210-*a* may be directly coupled with the gateway processors 215-*d* and 215-*e* via the signal bus 240-*c* and indirectly coupled with the gateway processors 215-*f* and 215-*g* via the signal bus 240-*c*. In some examples, the signal buses 240 may be examples of ethernet cables and the first communication protocol may be an ethernet communication protocol according to which the central processors 210 and the gateway processors 215 may communicate.

Additionally, the devices 230 may be coupled with respective gateway processors 215 or central processors 210 via various signal buses 245 that operate according to one or more different communication protocols. In some examples, the one or more different communication protocols may be lower capacity or bandwidth communication protocols with respect to the first communication protocol, such as a serial communication protocol. The gateway processors 215 may be configured to translate information between the first communication protocol (e.g., used to communicate information between the gateway processors 215 and the central processors 210) and the one or more different communication protocols (e.g., used between the gateway processors 215 and the devices 230). For example, the gateway processor 215-*a* may translate information that is communicated from the central processor 210-*b* to the device 230-*a* from the first communication protocol to a second communication protocol. Additionally, the gateway processor 215-*a* may translate information that is communicated from the device 230-*a* to the central processor 210-*b* from the second communication protocol to the first communication protocol. As such, the central processors 210 may communicate information with the devices 230 to control various operations and functions of the vehicle 205 (e.g., such as operations related to autonomous driving, alert notifications, etc.).

The zonal computing system of the vehicle 205 may include one or more DLAs 235 configured to perform operations of the components of the zonal computing system by utilizing one or more neural networks. In some cases, the use of machine learning models, such as neural networks, may help to reduce power consumption and reduce latency, among other performance operations. The DLAs 235 may include machine learning processes and other advanced computing techniques that may be utilized by the components of the zonal computing system. For example, a processor of the vehicle 205 (e.g., a central processor 210, a gateway processor 215) may transmit information to a DLA 235 (e.g., via a cycle buffer, via a memory system 250), which the DLA 235 may use as input into one or more neural networks. The DLA 235 may transmit responsive information to the processor that is output by the one or more neural networks based on the information received from the processor. For instance, the processor may transmit information gathered from one or more devices 230 to the DLA 235, and the DLA 235 may input the information into one or more neural networks, for example, for the purposes of supporting data analytics or autonomous driving, among other operations of the vehicle 205 supported by the processor. The DLA 235 may transmit outputs of the one or neural networks to the processor, which the processor may use in performing, for example, the data analysis, autonomous driving, etc.

A DLA 235 may be included in (e.g., embedded in) or coupled with a central processor 210 or a gateway processor 215. For example, in the example of FIG. 2, the central processor 210-*a* may be coupled with a DLA 235-*a*, the central processor 210-*b* may include (e.g., be embedded with) a DLA 235-*b*, the gateway processor 215-*a* may be coupled with a DLA 235-*c*, the gateway processor 215-*e* may include a DLA 235-*d*, or a combination thereof. It is noted, however, that FIG. 2 depicts an example configuration of DLAs 235 within the vehicle 205 and that any combination of components of the zonal computing system may include or be coupled with a respective DLA 235.

One or more memory systems 250 (e.g., a memory system 110, with reference to FIG. 1) may be included in (e.g., embedded in) or coupled with a central processor 210 or a gateway processor 215 and coupled with a DLA 235. For example, in the example of FIG. 2, a memory system 250-*a* may be coupled with the central processor 210-*a* and the DLA 235-*a*, a memory system 250-*b* may be included (e.g., embedded) in the central processor 210-*b* and coupled with the DLA 235-*b*, a memory 250-*c* system may be coupled with the gateway processor 215-*a* and the DLA 235-*c*, a memory system 250-*d* may be included in the gateway processor 215-*e* and coupled with the DLA 235-*d*, or a combination thereof. It is noted, however, that FIG. 2 depicts an example configuration of memory systems 250 within the vehicle 205 and that any combination of components of the zonal computing system may include or be coupled with a respective memory system 250.

In some cases, the system 200 may use the devices 230 to measure or record various environmental factors or events. For example, one or more of the devices 230 may include or may be an example of cameras (e.g., rearview cameras, side view cameras) which may capture one or more video streams of the environment in the vicinity of the vehicle 205, such as videos streams of the rear of the vehicle 205. In some examples, the vehicle 205 may include multiple cameras, which may each capture video from different locations on the vehicle 205. For example, the vehicle 205 may include multiple rearview cameras, such as a center rearview camera, a left-side rearview camera, and a right-side rearview camera, among other rearview cameras that may be included in the vehicle 205. In some examples, the cameras may be configured to detect or determine one or more parameters associated with captured video streams, such as an illuminance of video streams, a contrast of video streams, or both. Additionally, or alternatively, one or more cameras may be equipped with or may make use of non-visible light sensors, such as IR light detectors (e.g., IR light emitting diodes (LEDs), IR light cameras).

Additionally, the vehicle 205 may include one or more LiDAR sensors, which may be configured to detect objects and determine a distance to the objects (e.g., a distance between the vehicle 205 and a detected object). The vehicle 205 may also include one or more radar sensors, which may be configured to detect objects, determine distances to detected objects, determine respective velocities of detected objects, or any combination thereof. The vehicle 205 may also include one or more sound navigation and ranging (sonar) sensors, which may be configured to use ultrasonic sound waves to detect positions of one or more objects (e.g., relative to the vehicle 205).

The system 200 may use one or more of the DLAs 235 to perform analysis on information collected from the devices 230. For example, the gateway processors 215, the central processors 210, or both, may receive information associated with an environment of the vehicle 205 and output the data to one or more DLAs 235. In some examples, the one or more DLAs 235 may perform a compression operation on the information (e.g., via one or more machine learning models). In some examples, the one or more DLAs 235 may perform the compression operation to reduce a resolution or frame rate associated with the information based on one or more latency parameters associated with performing run-time analysis. For example, the one or more DLAs 235 may be configured with a duration of time within which to perform run-time analysis on the information. For instance, run-time analysis may be associated with relatively low latency constraints in order for the analysis to be utilized in operation of the vehicle 205. In some examples, performing the compression operation may decrease a time to perform run-time analysis on the information (e.g., relative performing the run-time analysis on uncompressed information) such that the configured duration may be satisfied. The one or more DLAs 235 may generate a first set of analytics during run-time of the vehicle 205 using the compressed information, which may increase the efficiency of generating the set of analytics. In some examples, the one or more DLAs 235 may generate the first set of analytics using uncompressed information received from the devices 230 (e.g., without performing the compression operation). In some examples, performing the compression operation may increase a storage efficiency of storing the information by decreasing a storage space occupied by the information.

The one or more DLAs 235 may output the first set of analytics to one or more storage components associated with the vehicle, such as to one or more memory devices of one or more memory systems 250, for storage of the first set of analytics. In some examples, the DLAs 235 may output the compressed information to the one or more memory devices for storage of the compressed information.

Additionally, or alternatively, the gateway processors 215, the central processors 210, or both may receive information from the devices 230 (e.g., information associated with an environment of the vehicle 205) and output the information (e.g., an uncompressed version of the information) to one or more memory devices of the vehicle 205 (e.g., at a memory system 250). That is, the information may be stored directly to the one or more memory devices without processing by the one or more DLAs 235. In some examples, the one or more DLAs 235 (e.g., or different DLAs 235) may receive (e.g., retrieve) the information stored at the one or more memory devices and generate a second set of analytics using the uncompressed information after generating the first set of analytics (e.g., on the compressed information) during run-time. In some examples, the one or more DLAs 235 may generate the second set of analytics using the compressed information stored to the one or more memory devices. In some examples, the DLAs 235 may generate the second set of analytics as part of a post-processing operation of the vehicle 205, which may be unassociated with the one or more latency parameters used during run-time. As such, the DLAs 235 may not be configured with a duration to satisfy when performing analysis during post-processing.

In some examples, the first set of analytics, the second set of analytics, or both, may include identification of one or more objects associated with the environment of the vehicle 205. For example, the first and/or second set of analytics may include location information associated with the one or more objects, a speed of the vehicle 205, a respective speed of the one or more objects, an acceleration of the vehicle 205, a respective acceleration of the one or more objects, an object type of the one or more objects. Additionally, or alternatively, the first and/or second set of analytics may identify an accident event of the vehicle 205. For example, the first and/or second set of analytics may identify one or more portions of the vehicle 205 associated with a collision with the one or more objects, an estimated force experienced by the vehicle 205 or a passenger of the vehicle 205 based on the collision, a prediction of the collision, or a combination thereof.

The first and second sets of analytics, the uncompressed information, the compressed information, or any combination thereof, may be stored to the one or more memory devices. Additionally, or alternatively, the first and second sets of analytics, the uncompressed information, the compressed information, or any combination thereof, may be stored at the remote server 225. For example, a central processor 210 may obtain the first and/or second sets of analytics, the uncompressed information, the compressed information, or any combination thereof (e.g., from one or more memory systems 250, from the one or more DLAs 235, via one or more gateway processors 215), communicate with the remote server 225, and output the first and second set of analytics, the uncompressed information, the compressed information, or any combination thereof, to the remote server 225 for storage.

Figure 3:
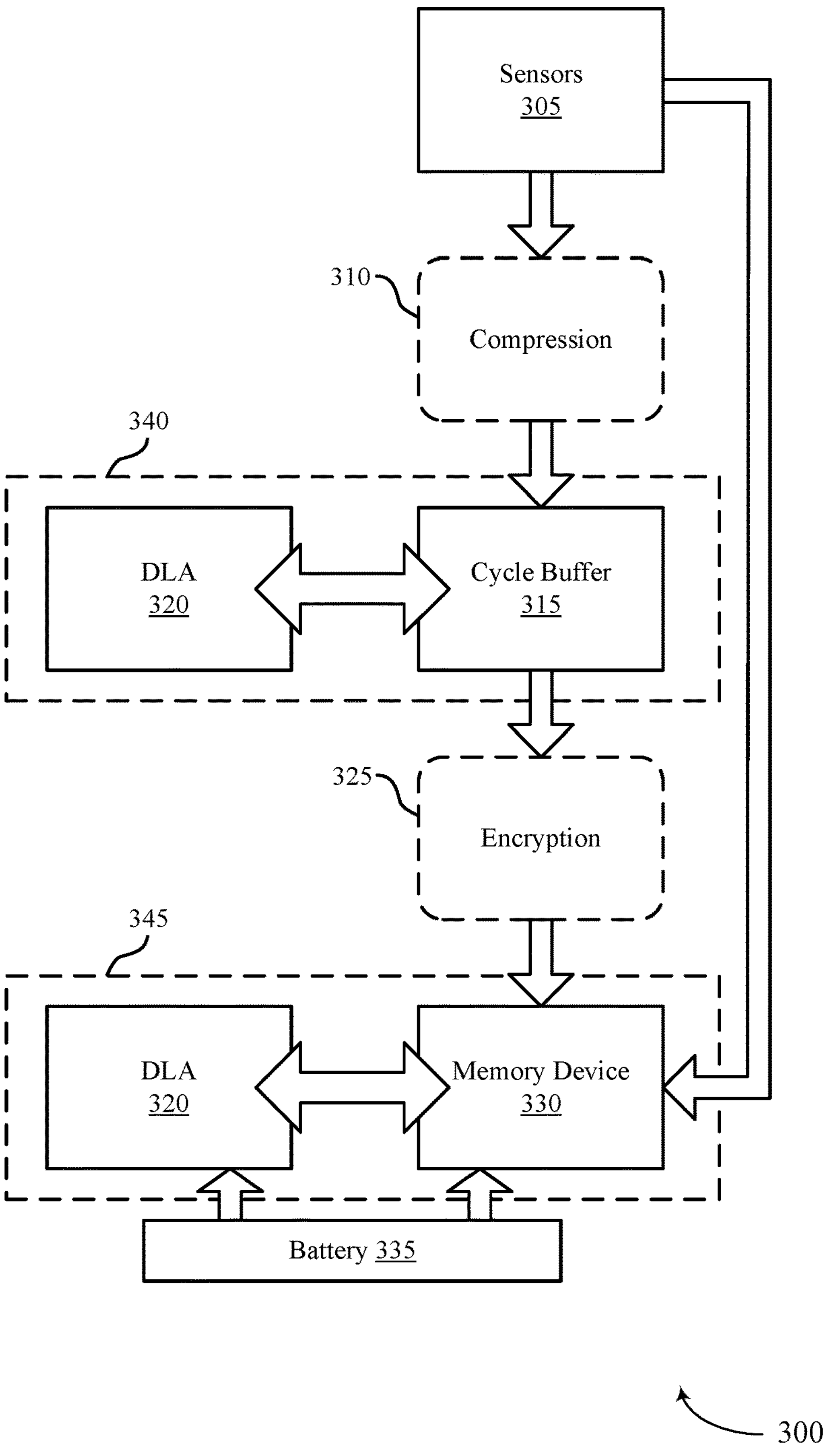

FIG. 3 illustrates an example of a system 300 that supports management of vehicle system information using a deep learning device in accordance with examples as disclosed herein. Aspects of the system 300 may be included in or may be implemented by aspects of the systems 100 and 200, as described with reference to FIGS. 1 and 2. For example, the system 300 may be integrated in the system 200, such as in the vehicle 205, and may support receiving information from a set of sensors 305 and using a DLA 320 to generate one or more sets of analytics as part of run-time and/or post-process operations of the vehicle 205. The DLA 320 may be an example of a DLA 190 or DLA 235 described with reference to FIGS. 1 and 2. In some examples, the system 300 may be implemented by (e.g., included in) a computing system, such as a zonal computing system of the vehicle 205 as described with reference to FIG. 2.

As illustrated in FIG. 3, the system 300 may include (e.g., be configured with) a set of one or more sensors 305. In some cases, the sensors 305 may be examples of the devices 230 with reference to FIG. 2. For instance, the sensors 305 may be configured to measure (e.g., record, capture, detect, track) a physical property associated with the vehicle, or an environment associated with the vehicle. In some examples, the sensors may be examples of one or more cameras, one or more light detection and ranging sensors, one or more radar sensors, one or more sonar sensors, a speedometer, an accelerometer, one or more IR light detectors, a geographic location device; among other computing components that may be included in the zonal computing system. The sensors 305 may capture various information (e.g., video of the surrounding environment of the vehicle, the speed of the vehicle, the acceleration of the vehicle, among other examples).

The information collected by the sensors 305 may be collected and stored at (e.g., transferred to) a volatile memory device of the vehicle. For example, a gateway processor (e.g., gateway processors 215) may be coupled with at least one of the central processor (e.g., central processor 210) and with one or more sensors 305. As such, the gateway processor, central processor, or both may collect the information and store the information to the volatile memory device of the memory system. In some examples, the volatile memory device may be an example of a cycle buffer 315. In some examples, the cycle buffer 315 may include (e.g., be an example of) SRAM included in a memory system (e.g., local memory 120 of a memory system) that may be coupled with or included in (e.g., embedded in) the central processor or the gateway processor. Additionally, or alternatively, the cycle buffer 315 may be an example of volatile memory closely coupled with the DLA 320. Further discussion of the physical relationship between the cycle buffer 315 and the DLA 320 is described herein, including with reference to FIG. 4.

In some examples, before storing the information to the cycle buffer 315, the information may go through one or more video compression operations. For example, the central processor, the gateway processor, the DLA 320, or a memory system controller may perform an optional video compression (e.g., high efficiency video coding (HEVC), moving picture experts group (MPEG), among other types of video compression) on the information collected from the sensors 305. After undergoing video compression, the information may be temporally stored at the cycle buffer 315.

As illustrated in FIG. 3, the cycle buffer 315 may be coupled with the DLA 320. As such, the DLA 320 may receive the information associated with the environment of the vehicle from the cycle buffer 315. The DLA 320 may perform one or more operations using one or more machine learning models. In some examples, the DLA 320 may receive the information from the cycle buffer 315 during a run-time 340 of the vehicle (e.g., a run-time phase of the vehicle). In some examples, run-time 340 of the vehicle is a duration of time after the information is recorded (e.g., captured, obtained) by the sensors 305 (e.g., directly after record) in which the DLA 320 may perform analysis on the information. For example, the information may be forwarded to the DLA 320 via the cycle buffer 315 as the information is recorded by the sensors 305 during the run-time 340. In some cases, the analysis performed during run-time 340 may be associated with one or more latency parameters. For example, the DLA 320 may be configured with a duration in which run-time 340 analytics may be generated by the DLA 320, such that the one or more latency parameters are satisfied. For instance, run-time 340 analytics may include information which the zonal computing system may use in operating the vehicle in real time. Excessive delay in generating the run-time 340 analytics may adversely affect the operation of the vehicle or reduce a relevance of the run-time 340 analytics with current operation of the vehicle. Accordingly, generating the run-time 340 analytics within the duration may increase the proper operation of the vehicle and relevance of the run-time 340 analytics.

To satisfy the configured duration of time, the DLA 320 may perform a compression operation on the information (e.g., using one or more of the machine learning models). For example, the DLA 320 may use the machine learning models to reduce a resolution associated with the information (e.g., a resolution of video captured by one or more cameras), a frame rate associated with the information (e.g., a frame rate of the video), or both. Based on (e.g., after) performing the compression operation, the DLA 320 may perform a first set of analytics (e.g., run-time 340 analytics) associated with operation of the vehicle. As such, the DLA 320 may perform the compression operation and generate the first set of analytics using the compressed information (e.g., inputting the compressed information into the one or more machine learning models) within the configured duration of time associated with run-time 340. In some examples, the DLA 320 may perform the compression operation on the information irrespective of the duration of time, for example, to reduce a storage space occupied by the information (e.g., and the run-time 340 analytics).

In some examples, the first set of analytics and/or the compressed information may be stored to one or more storage components associated with the vehicle. For example, the DLA 320 may output (e.g., store) the compressed information to a memory device 330 of the vehicle. Additionally or alternatively, the DLA 320 may output (e.g., store) the first set of analytics to the memory device 330. The memory device 330 may be an example of a non-volatile memory device which may be included (e.g., embedded in) a memory system (e.g., directly) coupled with the DLA 320.

The DLA 320 may generate a second set of analytics during a post-processing 345 of the vehicle. In some examples, the post-processing 345 may occur after the DLA 320 processes the information (e.g., compresses the information, generates the first set of analytics, stores the compressed information and/or the first set of analytics to the memory device 330, or a combination thereof). In some examples, post-processing 345 may be performed concurrent with run-time 340 analytics generated based on subsequently captured information. For example, the DLA 320 may generate run-time 340 analytics on information captured by the sensors 305 as the information is received from the sensors 305 and may continue to generate respective run-time 340 analytics on subsequent information as it is received from the sensors 305. At some time after the respective information is processed by the DLA 320 during run-time 340, the DLA 320 may generate post-processing 345 analytics based on the respective information, which may occur while the DLA 320 is generating run-time 340 analytics on other information received from the sensors 305.

The second set of analytics may be unassociated with one or more latency parameters, and as such, generating the second set of analytics may be unassociated with a configured duration of time. Based on the post-processing 345 being unassociated with latency parameters, the second set of analytics may include a more in-depth analysis of information collected by the sensors 305. For example, the DLA 320 may generate the second set of analytics using the original frame rate and the original resolution of the information. In some examples, the second set of analytics may be generated using additional information subsequently collected by the sensors 305.

In some examples, the DLA 320 may generate the second set of analytics using the compressed information or an uncompressed version of the information. For example, as illustrated in FIG. 3, the gateway processor, the central processor, or both may collect the information from the sensors 305 and store a non-reduced (e.g., uncompressed) version of the information directly to the memory device 330. As such, the DLA 320 may generate, during post-processing 345, the second set of analytics using the non-reduced version of the information stored at the memory device 330. Additionally, or alternatively, the DLA 320 may generate, during the post-processing 345, the second set of analytics using the compressed information stored at the memory device 330. Based on (e.g., after) generating the second set of analytics, the DLA 320 may store the second set of analytics to the memory device 330. In some examples, the run-time 340 analytics and the post-processing 345 analytics may be performed by respective (e.g., different) DLAs 320 at the vehicle.

In some examples, the sets of analytics may include identification of one or more objects associated with the environment of the vehicle. For example, the sets of analytics may include location information associated with the one or more objects, a speed of the vehicle, a respective speed of the one or more objects, an acceleration of the vehicle, a respective acceleration of the one or more objects, an object type of the one or more objects. Additionally, or alternatively, the sets of analytics may identify an accident event of the vehicle. For example, the sets of analytics may identify one or more portions of the vehicle associated with a collision with the one or more objects, an estimated force experienced by the vehicle, or a passenger of the vehicle based on the collision, a prediction of the collision, or a combination thereof. In examples where the collision occurs between the vehicle and a second vehicle, the sets of analytics may identify a type of vehicle of the second vehicle (e.g., color, make, and model of the second vehicle) and identifying information of the second vehicle (e.g., license plate number).

In some examples, the DLA 320 may be configured to perform one or more encryption 325 operations. For example, the DLA 320 may encrypt, using one or more machine learning models, the first set of analytics, the second set of analytics, the compressed information, the uncompressed information, or a combination thereof using the one or more encryption 325 operations. As such, encrypted versions of the first set of analytics, the second set of analytics, the compressed information, and the uncompressed information may be stored to the memory device 330.

In some examples, the DLA 320 and/or the memory device 330 may be coupled with a battery 335 at the vehicle. In some instances, battery 335 may be a back-up power supply. For example, the DLA 320 and memory device 330 may be powered by one or more power components of the vehicle. As such, if the DLA 320 or memory device 330 lose power from the one or more power components (e.g., due to a vehicle malfunction or a vehicle accident), then the battery 335 may continue to provide power to the DLA 320 and the memory device 330. The use of the battery 335 may increase the reliability of the DLA 320 and the memory device 330 and allow the DLA 320 to continuously generate the sets of analytics, for example, during a vehicle collision.

Figure 4:
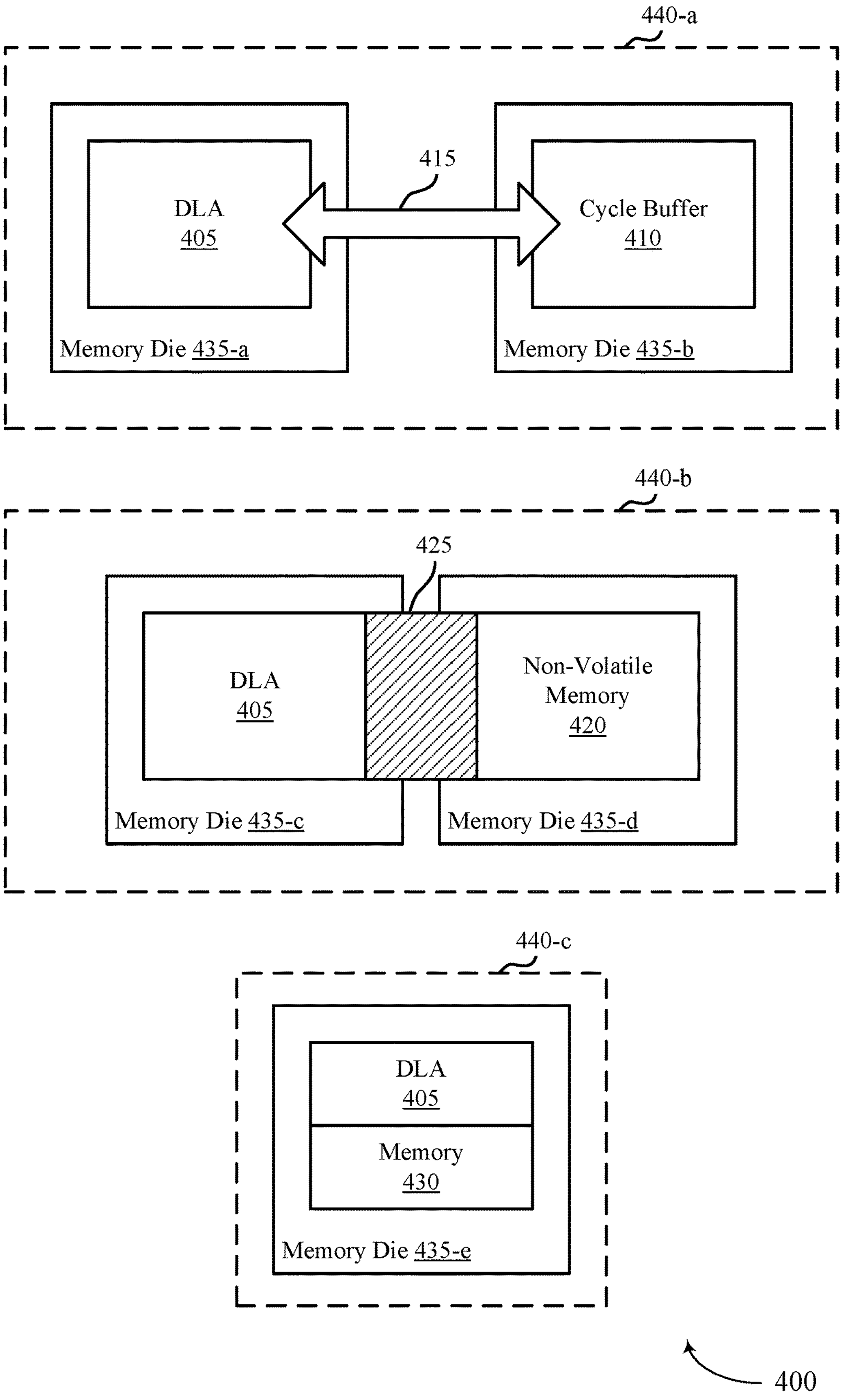

FIG. 4 illustrates an example of a system 400 that supports management of vehicle system information using a deep learning device in accordance with examples as disclosed herein. Aspects of the system 400 may be included in or may be implemented by aspects of the systems 100 through 300, as described with reference to FIGS. 1 through 3. For example, a DLA 405 may be an example of a DLA 190, 235, or 320 and a cycle buffer 410 may be an example of a cycle buffer 315, with reference to FIGS. 1 through 3. In some examples, the system 400 may be integrated in the system 200, such as in the vehicle 205, and may support information from a set of sensors and use of the DLA 405 to generate one or more sets of analytics during run-time and/or post-process operations of the vehicle. In some examples, the system 400 may be implemented by (e.g., included in) a computing system, such as a zonal computing system of the vehicle as described with reference to FIGS. 2 and 3.

In some examples, FIG. 4 may illustrate one or more configurations 440 that illustrate various relationships between the DLA 405 and one or more types of memory (e.g., volatile memory or non-volatile memory). For example, a configuration 440-*a* may illustrate the DLA 405 as being included in (e.g., attached to) a first memory die 435-*a* and the cycle buffer 410 being included in (e.g., attached to) a second memory die 435-*b*. Here, the DLA 405 and the cycle buffer 410 may be coupled across the respective memory dies 435 via one or more signal buses 415. In some examples, the cycle buffer 410 may be an example of SRAM included in (e.g., embedded in) a memory system that is attached to the memory die 435-*b*. As such, the cycle buffer 410 may be an example of a volatile memory device that may temporarily store information collected from one or more sensors (e.g., sensors 305) of the vehicle. In some examples, the DLA 405 may receive the information temporally stored at the cycle buffer 410 via the one or more signal buses 415.

In some examples, a configuration 440-*b* may illustrate the DLA 405 as being included in (e.g., attached to) a first memory die 435-*c* and a non-volatile memory 420 being included in (e.g., attached to) a second memory die 435-*d*. In some examples, the DLA 405 and the non-volatile memory 420 may be hybrid bonded via a hybrid bond 425. In some examples, hybrid bonding may be a type of bond that combines a dielectric bond with embedded metal to form interconnections between the DLA 405 and the non-volatile memory 420. In some cases, a hybrid bond may be an example direct bond interconnect (DBI). For example, DBI may connect the memory die 435-*c* and the memory die 435-*d* via closely spaced metal pads (e.g., copper pads). As such, the hybrid bond 425 may allow for face-to-face connection between the DLA 405 and the non-volatile memory 420. In some examples, the non-volatile memory 420 may be example of the memory device 330 with reference to FIG. 3. In some examples, the DLA 405 may store information collected from the sensors and sets of analytics associated with the information to the non-volatile memory 420.

In some examples, a configuration 440-*c* may illustrate the DLA 405 as being included in a single memory die 435-*e*, where the DLA 405 may be associated with memory 430. In some examples, the memory 430 may be included in (e.g., embedded in) the DLA 405. In such examples, the memory 430 may be an example of non-volatile memory, volatile memory, or both. Additionally, or alternatively, the memory 430 may be an example of the cycle buffer 410. In such examples, the DLA 405 and the cycle buffer 410 may be coupled and included in the same memory die 435-*e*. Additionally, or alternatively, the memory 430 may be an example of the memory device 330, with reference to FIG. 3. In such examples, the memory 430 may be an example of a non-volatile memory device included in a memory system, where the memory system and the DLA are attached to the same memory die 435-*e*.

Figure 5:
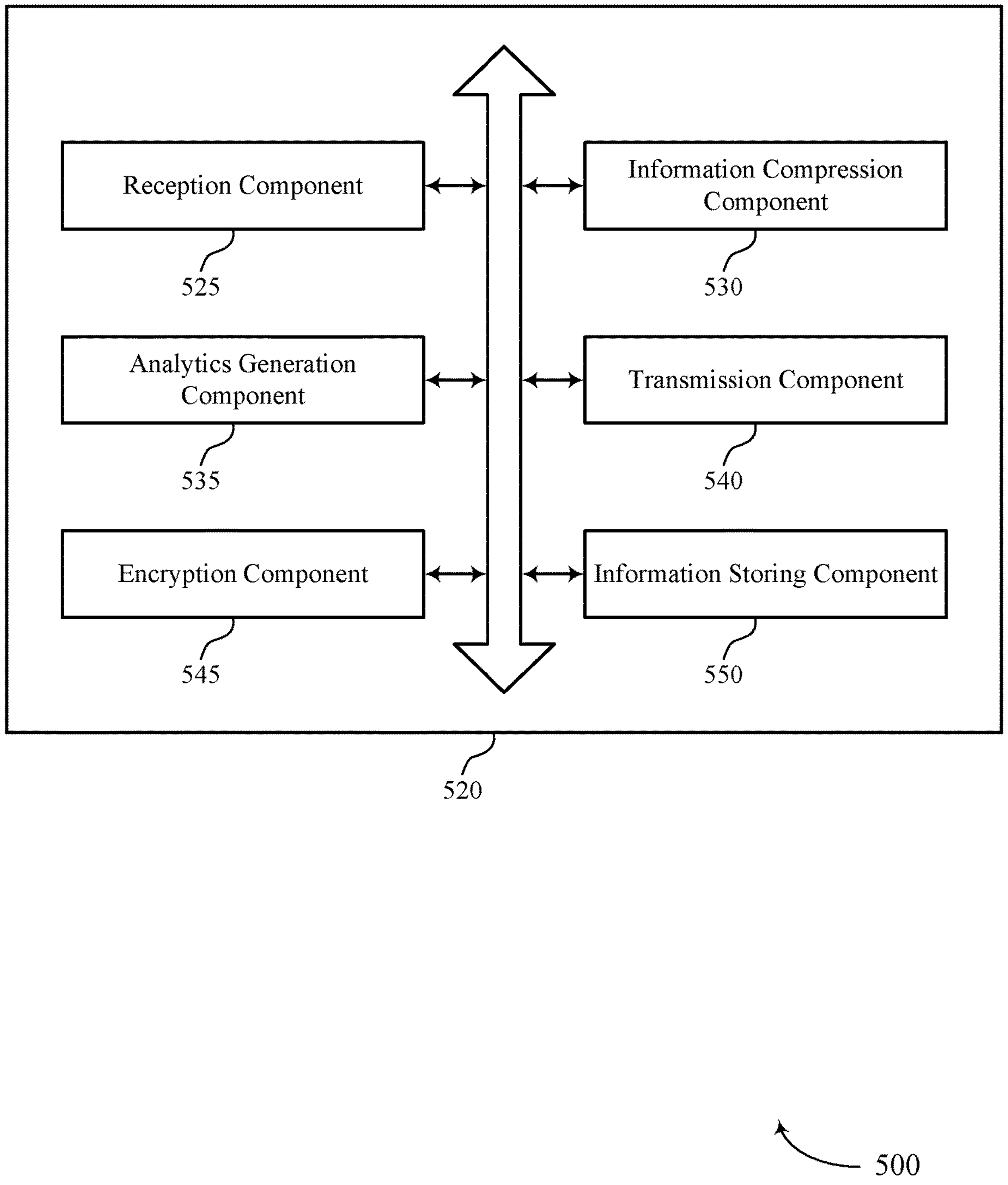
FIG. 5 illustrates a block diagram of a deep learning device that supports management of vehicle system information using a deep learning device in accordance with examples as disclosed herein.

FIG. 5 illustrates a block diagram 500 of a deep learning device 520 (e.g., a DLA) that supports management of vehicle system information using a deep learning device in accordance with examples as disclosed herein. The deep learning device 520 may be an example of aspects of a deep learning device (e.g., a DLA) as described with reference to FIGS. 1 through 4. The deep learning device 520, or various components thereof, may be an example of means for performing various aspects of management of vehicle system information using a deep learning device as described herein. For example, the deep learning device 520 may include a reception component 525, an information compression component 530, an analytics generation component 535, a transmission component 540, an encryption component 545, an information storing component 550, or any combination thereof. Each of these components may communicate, directly or indirectly, with one another (e.g., via one or more buses).

The reception component 525 may be configured as or otherwise support a means for receiving, at a deep learning device directly coupled with a non-volatile memory device of a vehicle (e.g., the deep learning device 520), information associated with an environment of the vehicle from one or more sensors of the vehicle, the deep learning device for performing one or more operations using one or more machine learning models. The information compression component 530 may be configured as or otherwise support a means for performing, at the deep learning device, a compression operation on the information based at least in part on receiving the information. The analytics generation component 535 may be configured as or otherwise support a means for generating, at the deep learning device, a set of analytics associated with operation of the vehicle based at least in part on the compressed information. The transmission component 540 may be configured as or otherwise support a means for outputting the set of analytics and the compressed information to one or more storage components associated with the vehicle.

In some examples, to support generating the set of analytics, the analytics generation component 535 may be configured as or otherwise support a means for generating the set of analytics in accordance with a duration associated with performing run-time analysis of the operation of the vehicle, the set of analytics generated within the duration.

In some examples, the analytics generation component 535 may be configured as or otherwise support a means for generating, at the deep learning device, a second set of analytics after outputting the set of analytics and the compressed information to the one or more storage components, where the second set of analytics are associated with a post-processing analysis of the operation of the vehicle and unassociated with the duration.

In some examples, the information compression component 530 may be configured as or otherwise support a means for reducing, based at least in part on the duration, a resolution associated with the information, a frame rate associated with the information, or a combination thereof, where the set of analytics are generated within the duration based at least in part on the reducing.

In some examples, the analytics generation component 535 may be configured as or otherwise support a means for generating, at the deep learning device, a second set of analytics, where the second set of analytics are generated using a non-reduced version of the information based at least in part on being associated with post-processing analysis of the operation of the vehicle.

In some examples, the encryption component 545 may be configured as or otherwise support a means for encrypting, at the deep learning device, the set of analytics and the compressed information, where outputting the set of analytics and the compressed information to the one or more storage components associated with the vehicle is based at least in part on the encrypting.

In some examples, the information storing component 550 may be configured as or otherwise support a means for storing the information from the one or more sensors of the vehicle directly to the non-volatile memory device of the vehicle. In some examples, the reception component 525 may be configured as or otherwise support a means for receiving, at the deep learning device, the information stored to the non-volatile memory device. In some examples, the analytics generation component 535 may be configured as or otherwise support a means for generating, at the deep learning device, a second set of analytics associated with the operation of the vehicle based at least in part on the information stored to the non-volatile memory device.

In some examples, the information compression component 530 may be configured as or otherwise support a means for performing, before the compression operation, a second compression operation on the information using one or more video compression operations.

In some examples, the set of analytics includes identification of one or more objects associated with the environment of the vehicle, location information associated with the one or more objects, a speed of the vehicle, a respective speed of the one or more objects, an acceleration of the vehicle, a respective acceleration of the one or more objects, an object type of the one or more objects, one or more portions of the vehicle associated with a collision with the one or more objects, an estimated force experienced by the vehicle or a passenger of the vehicle based at least in part on the collision, a prediction of the collision, or a combination thereof.

In some examples, the one or more sensors include one or more cameras, one or more LiDAR sensors, one or more radar sensors, one or more sonar sensors, a speedometer, an accelerometer, one or more IR light detectors, a geographic location device, or a combination thereof.

Figure 6:
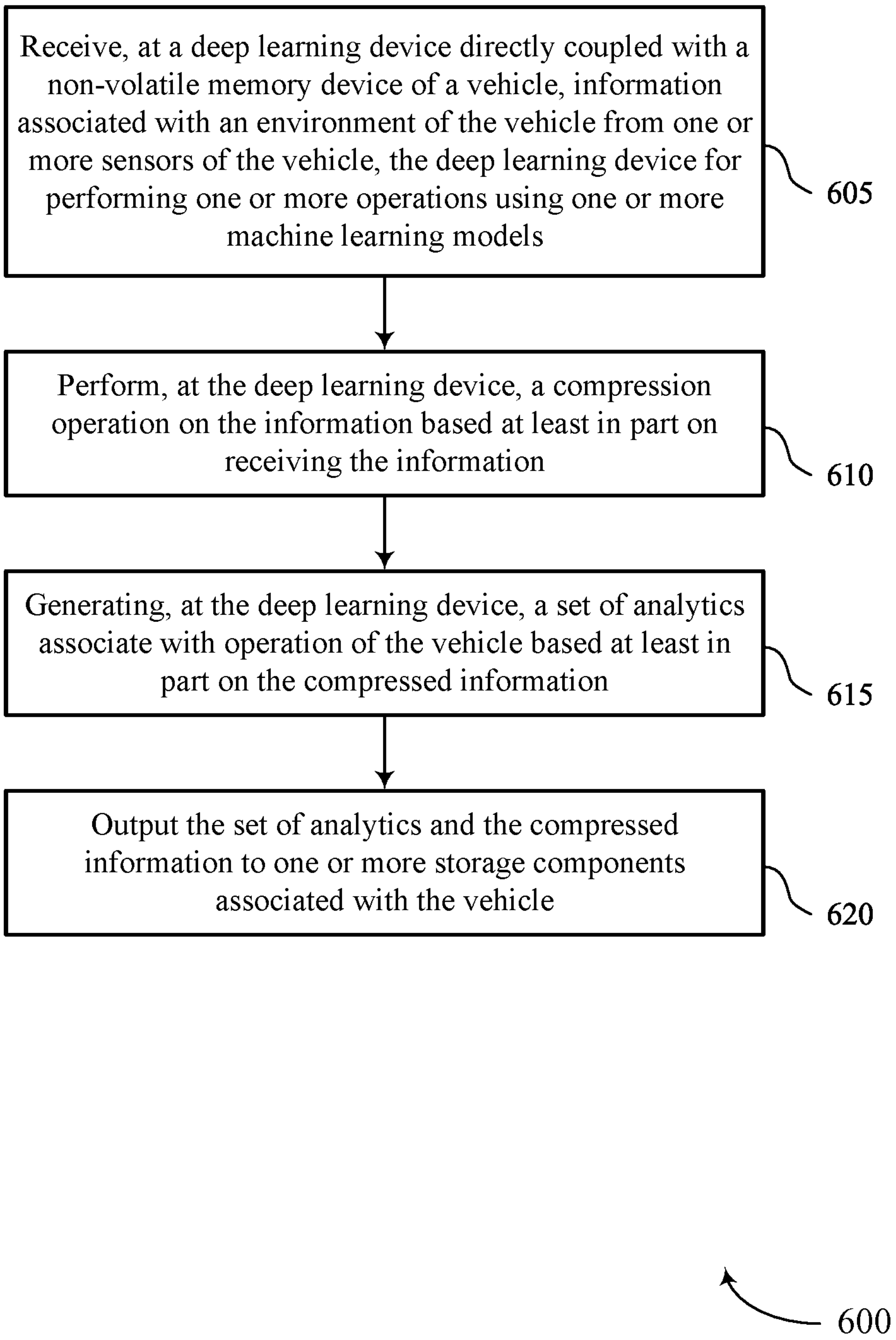
FIG. 6 illustrates a flowchart showing a method or methods that support management of vehicle system information using a deep learning device in accordance with examples as disclosed herein.

FIG. 6 illustrates a flowchart showing a method 600 that supports management of vehicle system information using a deep learning device in accordance with examples as disclosed herein. The operations of method 600 may be implemented by a deep learning device (e.g., a DLA) or its components as described herein. For example, the operations of method 600 may be performed by a deep learning device as described with reference to FIGS. 1 through 5. In some examples, a deep learning device may execute a set of instructions to control the functional elements of the device to perform the described functions. Additionally, or alternatively, the deep learning device may perform aspects of the described functions using special-purpose hardware.

At 605, the method may include receiving, at a deep learning device directly coupled with a non-volatile memory device of a vehicle, information associated with an environment of the vehicle from one or more sensors of the vehicle, the deep learning device for performing one or more operations using one or more machine learning models. The operations of 605 may be performed in accordance with examples as disclosed herein. In some examples, aspects of the operations of 605 may be performed by a reception component 525 as described with reference to FIG. 5.

At 610, the method may include performing, at the deep learning device, a compression operation on the information based at least in part on receiving the information. The operations of 610 may be performed in accordance with examples as disclosed herein. In some examples, aspects of the operations of 610 may be performed by an information compression component 530 as described with reference to FIG. 5.

At 615, the method may include generating, at the deep learning device, a set of analytics associated with operation of the vehicle based at least in part on the compressed information. The operations of 615 may be performed in accordance with examples as disclosed herein. In some examples, aspects of the operations of 615 may be performed by an analytics generation component 535 as described with reference to FIG. 5.

At 620, the method may include outputting the set of analytics and the compressed information to one or more storage components associated with the vehicle. The operations of 620 may be performed in accordance with examples as disclosed herein. In some examples, aspects of the operations of 620 may be performed by a transmission component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a deep learning device directly coupled with a non-volatile memory device of a vehicle, information associated with an environment of the vehicle from one or more sensors of the vehicle, the deep learning device for performing one or more operations using one or more machine learning models; performing, at the deep learning device, a compression operation on the information based at least in part on receiving the information; generating, at the deep learning device, a set of analytics associated with operation of the vehicle based at least in part on the compressed information; and outputting the set of analytics and the compressed information to one or more storage components associated with the vehicle.

Aspect 2: The method, apparatus, or non-transitory computer-readable medium of aspect 1, where generating the set of analytics further includes operations, features, circuitry, logic, means, or instructions, or any combination thereof for generating the set of analytics in accordance with a duration associated with performing run-time analysis of the operation of the vehicle, the set of analytics generated within the duration.

Aspect 3: The method, apparatus, or non-transitory computer-readable medium of aspect 2, further including operations, features, circuitry, logic, means, or instructions, or any combination thereof for generating, at the deep learning device, a second set of analytics after outputting the set of analytics and the compressed information to the one or more storage components, where the second set of analytics are associated with a post-processing analysis of the operation of the vehicle and unassociated with the duration.

Aspect 4: The method, apparatus, or non-transitory computer-readable medium of any of aspects 2 through 3, further including operations, features, circuitry, logic, means, or instructions, or any combination thereof for reducing, based at least in part on the duration, a resolution associated with the information, a frame rate associated with the information, or a combination thereof, where the set of analytics are generated within the duration based at least in part on the reducing.

Aspect 5: The method, apparatus, or non-transitory computer-readable medium of aspect 4, further including operations, features, circuitry, logic, means, or instructions, or any combination thereof for generating, at the deep learning device, a second set of analytics, where the second set of analytics are generated using a non-reduced version of the information based at least in part on being associated with post-processing analysis of the operation of the vehicle.

Aspect 6: The method, apparatus, or non-transitory computer-readable medium of any of aspects 1 through 5, further including operations, features, circuitry, logic, means, or instructions, or any combination thereof for encrypting, at the deep learning device, the set of analytics and the compressed information, where outputting the set of analytics and the compressed information to the one or more storage components associated with the vehicle is based at least in part on the encrypting.

Aspect 7: The method, apparatus, or non-transitory computer-readable medium of any of aspects 1 through 6, further including operations, features, circuitry, logic, means, or instructions, or any combination thereof for storing the information from the one or more sensors of the vehicle directly to the non-volatile memory device of the vehicle; receiving, at the deep learning device, the information stored to the non-volatile memory device; and generating, at the deep learning device, a second set of analytics associated with the operation of the vehicle based at least in part on the information stored to the non-volatile memory device.

Aspect 8: The method, apparatus, or non-transitory computer-readable medium of any of aspects 1 through 7, further including operations, features, circuitry, logic, means, or instructions, or any combination thereof for performing, before the compression operation, a second compression operation on the information using one or more video compression operations.

Aspect 9: The method, apparatus, or non-transitory computer-readable medium of any of aspects 1 through 8, where the set of analytics includes identification of one or more objects associated with the environment of the vehicle, location information associated with the one or more objects, a speed of the vehicle, a respective speed of the one or more objects, an acceleration of the vehicle, a respective acceleration of the one or more objects, an object type of the one or more objects, one or more portions of the vehicle associated with a collision with the one or more objects, an estimated force experienced by the vehicle or a passenger of the vehicle based at least in part on the collision, a prediction of the collision, or a combination thereof.

Aspect 10: The method, apparatus, or non-transitory computer-readable medium of any of aspects 1 through 9, where the one or more sensors include one or more cameras, one or more LiDAR sensors, one or more radar sensors, one or more sonar sensors, a speedometer, an accelerometer, one or more IR light detectors, a geographic location device, or a combination thereof.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: one or more sensors of a vehicle; a volatile memory device configured to receive information associated with an environment of the vehicle from the one or more sensors; a non-volatile memory device; and a deep learning device directly coupled with the non-volatile memory device and configured to perform one or more operations using one or more machine learning models, where the deep learning device is further configured to: receive, from the volatile memory device, the information; perform a compression operation on the information based at least in part on receiving the information at the deep learning device; generate a set of analytics associated with operation of the vehicle based at least in part on the compressed information; and output the set of analytics and the compressed information to the non-volatile memory device.

Aspect 12: The apparatus of aspect 11, where the deep learning device and the volatile memory device are included in a same memory die of the apparatus.

Aspect 13: The apparatus of aspect 11, where the deep learning device is included in a first memory die of the apparatus and the volatile memory device is included in a second memory die of the apparatus, the first memory die coupled with the second memory die.

Aspect 14: The apparatus of any of aspects 11 through 13, where the deep learning device is included in a first memory die of the apparatus and the non-volatile memory device is associated to a second memory die of the apparatus, and the first memory die and the second memory die are hybrid bonded.

Aspect 15: The apparatus of any of aspects 11 through 14, where, to generate the set of analytics, the deep learning device is configured to: generate the set of analytics in accordance with a duration associated with performing run-time analysis of the operation of the vehicle, the set of analytics generated within the duration.

Aspect 16: The apparatus of aspect 15, where the deep learning device is further configured to: generate a second set of analytics after outputting the set of analytics and the compressed information to the non-volatile memory device, where the second set of analytics are associated with a post-processing analysis of the operation of the vehicle and unassociated with the duration.

Aspect 17: The apparatus of any of aspects 15 through 16, where the deep learning device is further configured to: reduce, based at least in part on the duration, a resolution associated with the information, a frame rate associated with the information, or a combination thereof, where the set of analytics are generated within the duration based at least in part on the reducing.

Aspect 18: The apparatus of aspect 17, where the deep learning device is further configured to: generate a second set of analytics, where the second set of analytics are generated using a non-reduced version of the information based at least in part on being associated with post-processing analysis of the operation of the vehicle.

Aspect 19: The apparatus of any of aspects 11 through 18, where the deep learning device is further configured to: encrypt the set of analytics and the compressed information, where outputting the set of analytics and the compressed information to the non-volatile memory device is based at least in part on the encrypting.

Aspect 20: The apparatus of any of aspects 11 through 19, where the one or more sensors, the volatile memory device, the non-volatile memory device, and the deep learning device are included in a zonal computing system of the vehicle, the zonal computing system further including: a central processor configured to communicate with a remote server and a plurality of zones associated with the zonal computing system; and a gateway processor coupled with the central processor and associated with a zone of the plurality of zones, where the gateway processor is configured to route communications between the central processor and components of the zonal computing system, and where the volatile memory device is configured to receive the information via the gateway processor.

Aspect 21: The apparatus of any of aspects 11 through 20, where the set of analytics includes identification of one or more objects associated with the environment of the vehicle, location information associated with the one or more objects, a speed of the vehicle, a respective speed of the one or more objects, an acceleration of the vehicle, a respective acceleration of the one or more objects, an object type of the one or more objects, one or more portions of the vehicle associated with a collision with the one or more objects, an estimated force experienced by the vehicle or a passenger of the vehicle based at least in part on the collision, a prediction of the collision, or a combination thereof.

Aspect 22: The apparatus of any of aspects 11 through 21, where the one or more sensors include one or more cameras, one or more light detection and ranging sensors, one or more radar sensors, one or more sonar sensors, a speedometer, an accelerometer, one or more infrared light detectors, a geographic location device, or a combination thereof.

An apparatus is described. The following provides an overview of aspects of the apparatus as described herein:

Aspect 23: An apparatus, including: a deep learning device directly coupled with a non-volatile memory device; and a controller coupled with the deep learning device and operable to cause the apparatus to: receive, at the deep learning device of a vehicle, information associated with an environment of the vehicle from one or more sensors of the vehicle, the deep learning device for performing one or more operations using one or more machine learning models; compress, at the deep learning device, the information based at least in part on receiving the information at the deep learning device; generate, at the deep learning device, a set of analytics associated with operation of the vehicle based at least in part on the compressed information; and output, the set of analytics and the compressed information to one or more storage components associate with the vehicle.

Aspect 24: The apparatus of aspect 23, where, to generate the set of analytics, the controller is configured to cause the apparatus to: generate the set of analytics in accordance with a duration associated with performing run-time analysis of the operation of the vehicle, the set of analytics generated within the duration.

Aspect 25: The apparatus of any of aspects 23 through 24, where: the one or more sensors include one or more cameras, one or more light detection and ranging sensors, one or more radar sensors, one or more sonar sensors, a speedometer, an accelerometer, one or more infrared light detectors, or a combination thereof, and the set of analytics includes identification of one or more objects associated with the environment of the vehicle, location information associated with the one or more objects, a speed of the vehicle, a respective speed of the one or more objects, an acceleration of the vehicle, a respective acceleration of the one or more objects, an object type of the one or more objects, one or more portions of the vehicle associated with a collision with the one or more objects, an estimated force experienced by the vehicle or a passenger of the vehicle based at least in part on the collision, a prediction of the collision, or a combination thereof.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, at a deep learning device directly coupled with a non-volatile memory device of a vehicle, information associated with an environment of the vehicle from one or more sensors of the vehicle, the deep learning device for performing one or more operations using one or more machine learning models;

performing, at the deep learning device, a compression operation on the information based at least in part on receiving the information, wherein the compression operation is performed to satisfy a predetermined latency constraint for real-time vehicle operation;

generating, at the deep learning device, a set of run-time analytics associated with operation of the vehicle based at least in part on the compressed information, wherein the set of run-time analytics is generated within a predetermined duration from receiving the information;

generating, at the deep learning device, a set of post-processing analytics based on uncompressed information, wherein the set of post-processing analytics provides additional analysis than the set of run-time analytics; and outputting the set of run-time analytics, the set of post-processing analytics, and the compressed information to one or more storage components associated with the vehicle.

2. The method of claim 1, further comprising:

generating the set of post-processing analytics after outputting the set of run-time analytics and the compressed information to the one or more storage components, wherein the set of post-processing analytics are associated with a post-processing analysis of the operation of the vehicle and unassociated with the duration.

3. The method of claim 1, further comprising:

reducing, based at least in part on the duration, a resolution associated with the information, a frame rate associated with the information, or a combination thereof, wherein the set of run-time analytics are generated within the duration based at least in part on the reducing.

4. The method of claim 3, further comprising:

generating the set of post-processing analytics using a non-reduced version of the information based at least in part on being associated with post-processing analysis of the operation of the vehicle.

5. The method of claim 1, further comprising:

encrypting, at the deep learning device, the set of run-time analytics and the compressed information, wherein outputting the set of run-time analytics and the compressed information to the one or more storage components associated with the vehicle is based at least in part on the encrypting.

6. The method of claim 1, further comprising:

storing the information from the one or more sensors of the vehicle directly to the non-volatile memory device of the vehicle;

receiving, at the deep learning device, the information stored to the non-volatile memory device; and generating, at the deep learning device, a second set of analytics associated with the operation of the vehicle based at least in part on the information stored to the non-volatile memory device.

7. The method of claim 1, further comprising:

performing, before the compression operation, a second compression operation on the information using one or more video compression operations.

8. The method of claim 1, wherein the set of run-time analytics comprises identification of one or more objects associated with the environment of the vehicle, location information associated with the one or more objects, a speed of the vehicle, a respective speed of the one or more objects, an acceleration of the vehicle, a respective acceleration of the one or more objects, an object type of the one or more objects, one or more portions of the vehicle associated with a collision with the one or more objects, an estimated force experienced by the vehicle or a passenger of the vehicle based at least in part on the collision, a prediction of the collision, or a combination thereof.

9. The method of claim 1, wherein the one or more sensors comprise one or more cameras, one or more light detection and ranging sensors, one or more radar sensors, one or more sonar sensors, a speedometer, an accelerometer, one or more infrared light detectors, a geographic location device, or a combination thereof.

10. An apparatus, comprising:

one or more sensors of a vehicle;

a volatile memory device configured to receive information associated with an environment of the vehicle from the one or more sensors;

a non-volatile memory device; and a deep learning device directly coupled with the non-volatile memory device and configured to perform one or more operations using one or more machine learning models, wherein the deep learning device is further configured to:

receive, from the volatile memory device, the information;

perform a compression operation on the information based at least in part on receiving the information at the deep learning device, wherein the compression operation is performed to satisfy a predetermined latency constraint for real-time vehicle operation;

generate a set of run-time analytics associated with operation of the vehicle based at least in part on the compressed information, wherein the set of run-time analytics is generated within a predetermined duration from receiving the information;

generate a set of post-processing analytics based on uncompressed information, wherein the set of post-processing analytics provides additional analysis than the set of run-time analytics; and output the set of run-time analytics, the set of post-processing analytics, and the compressed information to the non-volatile memory device.

11. The apparatus of claim 10, wherein the deep learning device and the volatile memory device are included in a same memory die of the apparatus.

12. The apparatus of claim 10, wherein the deep learning device is included in a first memory die of the apparatus and the volatile memory device is included in a second memory die of the apparatus, the first memory die coupled with the second memory die.

13. The apparatus of claim 10, wherein the deep learning device is included in a first memory die of the apparatus and the non-volatile memory device is associated to a second memory die of the apparatus, and the first memory die and the second memory die are hybrid bonded.

14. The apparatus of claim 10, wherein the deep learning device is further configured to:

generate the set of post-processing analytics after outputting the set of run-time analytics and the compressed information to the non-volatile memory device, wherein the set of post-processing analytics are associated with a post-processing analysis of the operation of the vehicle and unassociated with the duration.

15. The apparatus of claim 10, wherein the deep learning device is further configured to:

reduce, based at least in part on the duration, a resolution associated with the information, a frame rate associated with the information, or a combination thereof, wherein the set of run-time analytics are generated within the duration based at least in part on the reducing.

16. The apparatus of claim 15, wherein the deep learning device is further configured to:

generate the set of post-processing analytics using a non-reduced version of the information based at least in part on being associated with post-processing analysis of the operation of the vehicle.

17. The apparatus of claim 10, wherein the one or more sensors, the volatile memory device, the non-volatile memory device, and the deep learning device are included in a zonal computing system of the vehicle, the zonal computing system further comprising:

a central processor configured to communicate with a remote server and a plurality of zones associated with the zonal computing system; and a gateway processor coupled with the central processor and associated with a zone of the plurality of zones, wherein the gateway processor is configured to route communications between the central processor and components of the zonal computing system, and wherein the volatile memory device is configured to receive the information via the gateway processor.

18. An apparatus, comprising:

a deep learning device directly coupled with a non-volatile memory device; and a controller coupled with the deep learning device and operable to cause the apparatus to:

receive, at the deep learning device of a vehicle, information associated with an environment of the vehicle from one or more sensors of the vehicle, the deep learning device for performing one or more operations using one or more machine learning models;

compress, at the deep learning device, the information based at least in part on receiving the information at the deep learning device, wherein the compression is performed to satisfy a predetermined latency constraint for real-time vehicle operation;

generate, at the deep learning device, a set of run-time analytics associated with operation of the vehicle based at least in part on the compressed information, wherein the set of run-time analytics is generated within a predetermined duration from receiving the information;

generate, at the deep learning device, a set of post-processing analytics based on uncompressed information, wherein the set of post-processing analytics provides additional analysis than the set of run-time analytics; and output, the set of run-time analytics, the set of post-processing analytics, and the compressed information to one or more storage components associated with the vehicle.

* * * * *